United States Patent
Christensen et al.

(10) Patent No.: US 9,260,256 B2
(45) Date of Patent: Feb. 16, 2016

(54) APPARATUS FOR HANDLING LAYERS OF PALLETIZED GOODS

(75) Inventors: Torben Christensen, Arden (DK); Henrik Kjeldgaard Hansen, Brønderslev (DK)

(73) Assignee: UNIVEYOR A/S, Arden (DK)

( * ) Notice: Subject to any disclaimer, the term of this patent is extended or adjusted under 35 U.S.C. 154(b) by 327 days.

(21) Appl. No.: 13/202,785

(22) PCT Filed: Feb. 25, 2010

(86) PCT No.: PCT/DK2010/050047
§ 371 (c)(1),
(2), (4) Date: Oct. 17, 2011

(87) PCT Pub. No.: WO2010/097088
PCT Pub. Date: Sep. 2, 2010

(65) Prior Publication Data
US 2012/0045309 A1    Feb. 23, 2012

(30) Foreign Application Priority Data
Feb. 27, 2009   (DK) .................... 2009 00285

(51) Int. Cl.
*B65G 57/04*   (2006.01)
*B65G 47/90*   (2006.01)
(Continued)

(52) U.S. Cl.
CPC ............ *B65G 47/90* (2013.01); *B65G 47/91* (2013.01); *B65G 59/02* (2013.01); *B65G 61/00* (2013.01)

(58) Field of Classification Search
CPC ........ B65G 57/06; B65G 57/26; B65G 57/24; B65G 57/005; B65G 61/00; B65G 59/023; B65G 57/22; B65G 59/02; B65G 59/04; B25J 9/1697; B25J 15/0616; B25J 9/021
USPC ............ 414/793, 792.7, 792.8, 793.4, 794.2, 414/796.2, 796.5, 796.9, 797, 791.1, 791.6, 414/792.9, 799, 627, 737, 744.1, 752.1; 271/67, 73; 294/188, 2, 183, 185; 901/40, 46, 47
See application file for complete search history.

(56) References Cited

U.S. PATENT DOCUMENTS 2,822,933 A * 2/1958 Pagdin ...................... 414/796.2
3,118,554 A * 1/1964 Brainard et al. ............. 414/619
(Continued)

FOREIGN PATENT DOCUMENTS

DE       42 06 038 A1    9/1993
WO       WO 00/64790     11/2000
(Continued)

*Primary Examiner* — Saul Rodriguez
*Assistant Examiner* — Lynn Schwenning
(74) *Attorney, Agent, or Firm* — Fitch, Even, Tabin & Flannery LLP

(57) ABSTRACT

An apparatus for handling layers of palletized goods is disclosed including a lift head with a substantially horizontal suction face sized for a pallet including downwardly open suction chambers, which via individual valves are connected to a vacuum source, incorporated in the lift head or provided externally. The suction face is movable against a top side of an upper layer of goods on a pallet. The valves are closed if the associated suction chamber is not closed downwardly by contacting the top side of the goods on the uppermost pallet layer. The lift head along the outer sides of the suction face includes a vertically adjustable skirt with inflatable squeezing pads for exerting an inwardly directed pressure on the outer sides of at least the goods in the upper pallet layer. The skirt interacts with a two-part flexible curtain at opposing ends of the suction face each of which are connected with the adjustable skirt and from each side of the suction face are moved inwardly along the underside of the lifted pallet layer to a position in the middle under the suction face so that the two-part flexible curtain is disposed at the underside of the pallet layer which is lifted and is capable of supporting the lifted pallet layer.

12 Claims, 5 Drawing Sheets

(51) Int. Cl.
  *B65G 47/91* (2006.01)
  *B65G 59/02* (2006.01)
  *B65G 61/00* (2006.01)

(56) References Cited

U.S. PATENT DOCUMENTS

| | | | |
|---|---|---|---|
| 5,024,575 A * | 6/1991 | Anderson | 414/627 |
| 5,984,620 A * | 11/1999 | Heston | 414/791.6 |
| 6,802,688 B1 | 10/2004 | Andersen et al. | |
| 2005/0265816 A1 | 12/2005 | Blanc | |
| 2006/0269389 A1 * | 11/2006 | Bolzani | 414/799 |
| 2008/0292444 A1 * | 11/2008 | Silva | 414/744.1 |
| 2009/0148266 A1 * | 6/2009 | Baumann et al. | 414/796.2 |
| 2009/0220327 A1 * | 9/2009 | Scholtes et al. | 414/749.6 |

FOREIGN PATENT DOCUMENTS

| | | | |
|---|---|---|---|
| WO | WO 2007/131668 A1 | 11/2007 | |
| WO | WO 2008/019691 A1 | 2/2008 | |
| WO | WO 2012/007853 * | 1/2012 | B65G 59/04 |

\* cited by examiner

APPARATUS FOR HANDLING LAYERS OF PALLETIZED GOODS

BACKGROUND OF THE INVENTION

1. Field of the Invention

The present invention concerns an apparatus for handling layers of palletized goods and of the kind indicated in the preamble of claim 1.

2. Description of the Prior Art

In order to provide effective and cheap distribution of goods, many goods are distributed on pallets, by way of example on so-called EU pallets (800×1200 mm). Yet a continuing increasing need has appeared for also dispatching orders comprising smaller consignments of goods in a correspondingly efficient way. Statistically it has appeared that many orders for small shops actually consist of consignments of goods often consisting of very few layers or maybe just a single layer of palletised goods.

WO 2000/64790 A1 and WO 2008/019691 A1 disclose apparatuses for handling layers of palletized goods. These apparatuses comprise a vertically displaceable lift head with a horizontal suction face which in size is adapted to a pallet and has a large number of downwards open suction chambers. The suction face is arranged to be moved downwards against the top side of an upper layer of individually or groupwise packed goods on a pallet, where the suction chambers via individual valves are connected with a source of vacuum incorporated in the lift head. These the apparatuses interact with depalletizing systems which are known per se.

The valves between the suction chambers and the source of vacuum are designed as ball valves with very light thin-walled valve bodies that are enclosed in the suction chamber by lateral projections or by a retainer net which interact with upper round valve openings with spherical valve seats at the bottom if the actual suction chamber is not closed at the bottom by contacting the top side of the goods in an upper pallet layer.

Along the outer sides of the suction face, the lift head comprises a squeezing mechanism for exerting an inwardly pressure at the outer sides of the goods in at least an uppermost pallet layer. In connection with each valve there are arresting means for preventing the valve balls from shutting off the valves, which ensure that the shut-off valves of the suction face can be forcibly opened where there is a contact to the goods in the pallet layer, and can be forcibly opened where there are gaps or openings in the pallet layer. The descriptions of these previous inventions are hereby incorporated in the present application by reference.

In connection with the hitherto common handling of layers of palletized goods, they primarily work with rectilinear lifting and moving of pallet layers, by moving pallet layers mutually between positions on mutually perpendicular pallet ways.

Experiments have been made using robot technology for moving palletized layers of goods by the current suction heads. However, using robots requires an entirely different movement pattern which also includes swinging movements of suction heads, which place significantly greater demands on the suction ability in order to hold the relatively heavy and possibly open pallet layer in a secure way during swinging movements where centrifugal force actions occur.

SUMMARY OF THE INVENTION

The invention is a new and improved apparatus for handling layers of palletized goods which enables achieving greater certainty, by way of example, by mechanized layer-wise destacking of individual articles from a pallet even if the individual pallet layers include gaps between the articles or include articles that are film-covered in such a way that openings in the pallet layer are formed upwards, and even if a lifting head operated by a robot with occurrence of relatively rapid swinging movements is used.

The apparatus includes an adjustable skirt interacting with a two-part flexible curtain which at opposing ends of the suction face each are connected with the adjustable skirt which from each side of the suction face are moved inwardly along the underside of the lifted pallet layer to a position predominantly under a middle of the suction face resulting in the two-part flexible curtain being disposed at the underside of the lifted pallet layer that is capable of supporting the lifted pallet layer.

By simple measures a new and significantly improved apparatus for handling pallet layers of mixed goods is achieved making possible handling many different types of palletized goods in layers with great certainty while using robot technology that includes relatively rapid swinging movements of the suction head.

The apparatus according to the invention includes a transverse end of curtain parts being connected with the skirt. An opposite end of curtain parts are connected to a rotating shaft for a magazine with associated drive motor. The curtain parts between the skirt and the magazines run around each transverse shaft which is movable inwardly along the underside of the lifted pallet layer. The transverse shafts are provided at opposing ends with a toothed rim which is in driving engagement with a stationary toothed rack running along opposite sides of the suction face perpendicularly to the transverse shafts. The transverse shafts are driven by a drive motor.

With the objective of ensuring a secure and stable engagement between the toothed rim and the toothed rack, the apparatus according to the invention is designed with the transverse shafts and the associated drive motors being suspended in support holders at opposite sides of a support frame by means of support rollers. The rollers are supported on a preferably complementary support profile of the support frame.

The apparatus according to the invention is suitably further designed with the drive motors being rapidly reversible servomotors with possible suitable gearing.

BRIEF DESCRIPTION OF THE DRAWINGS

The invention is explained in more detail in the following with reference to the drawing, on which.

DETAILED DESCRIPTION OF THE EMBODIMENTS OF THE INVENTION

Figure 1:
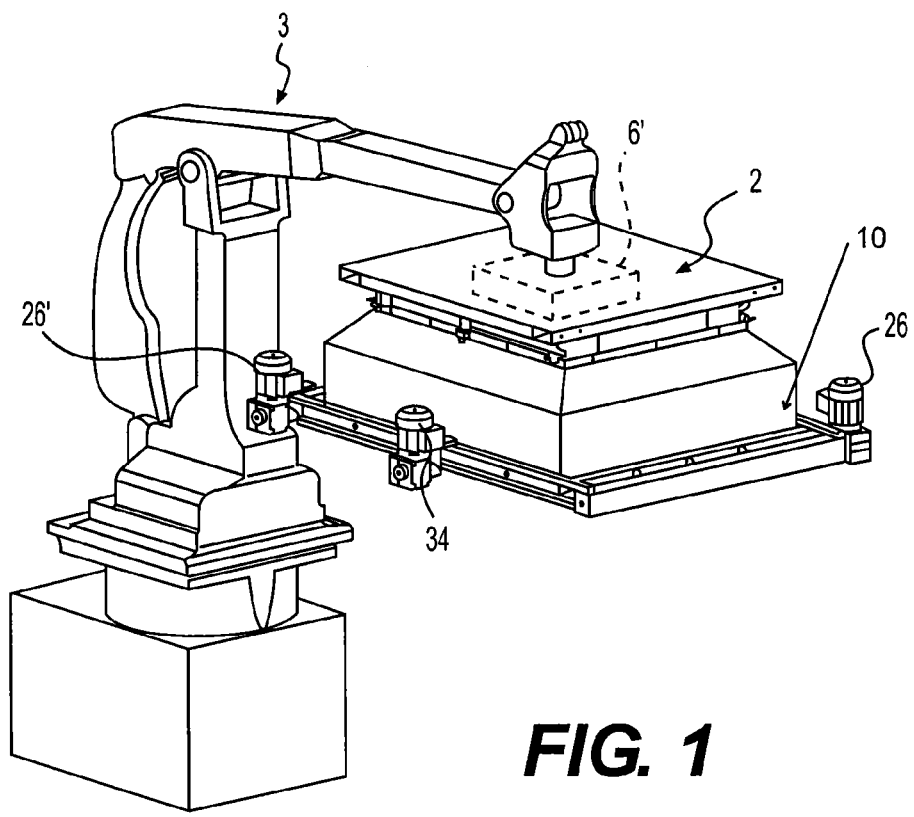
FIG. 1 shows a perspective view of an embodiment of an apparatus with a lift head according to the invention handled by a robot.
Figure 2:
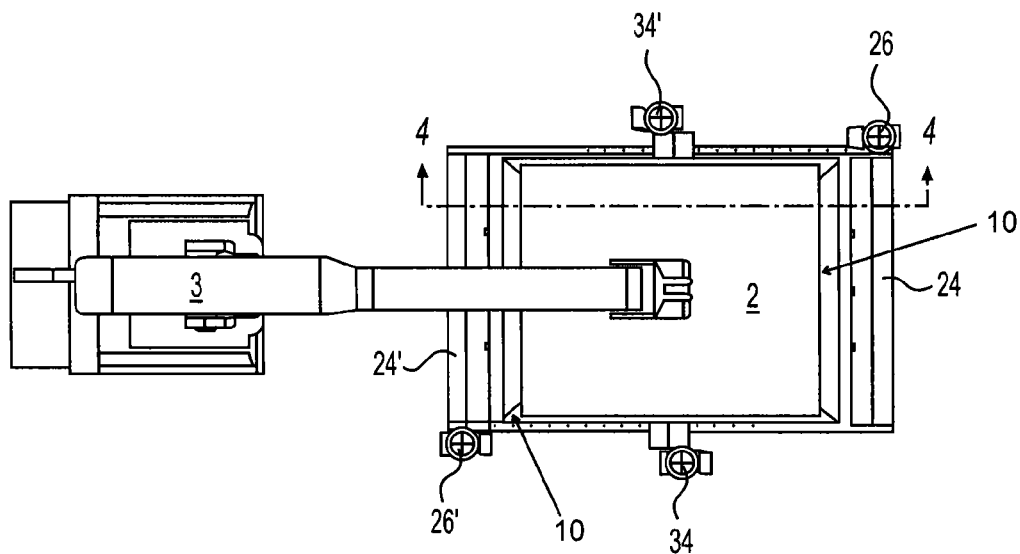
FIG. 2 shows a plan view of the apparatus shown in FIG. 1, as seen from the top.
Figure 3:
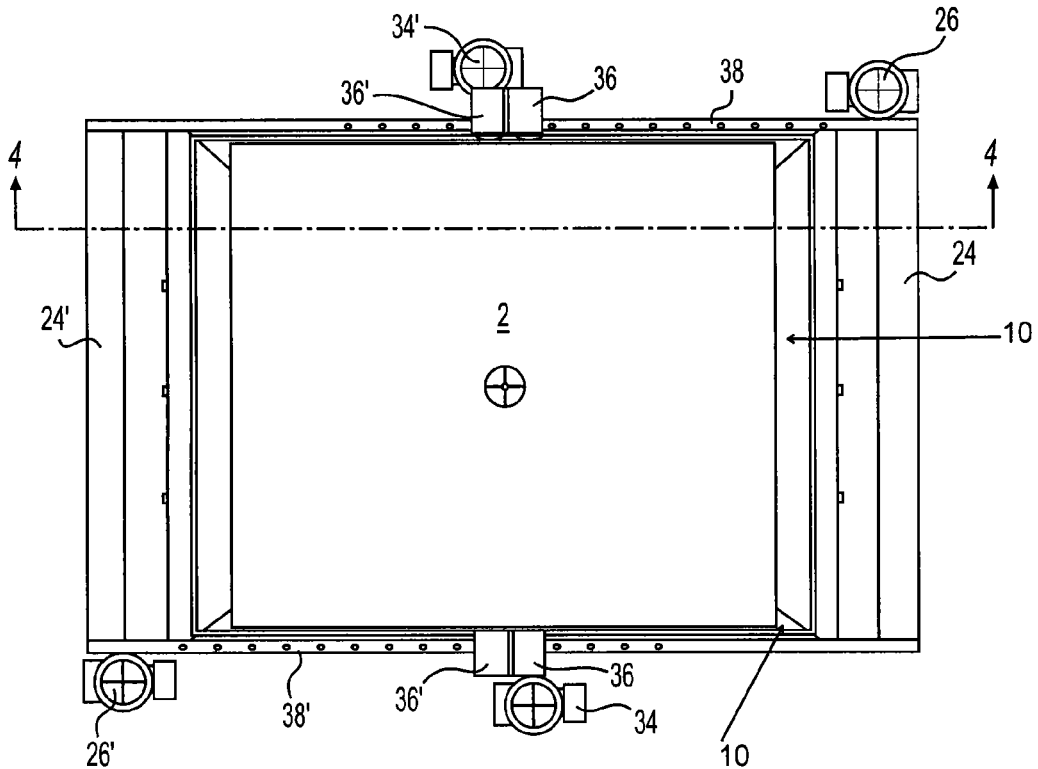
FIG. 3 shows a plan view of the lift head, as seen from above.
Figure 4:
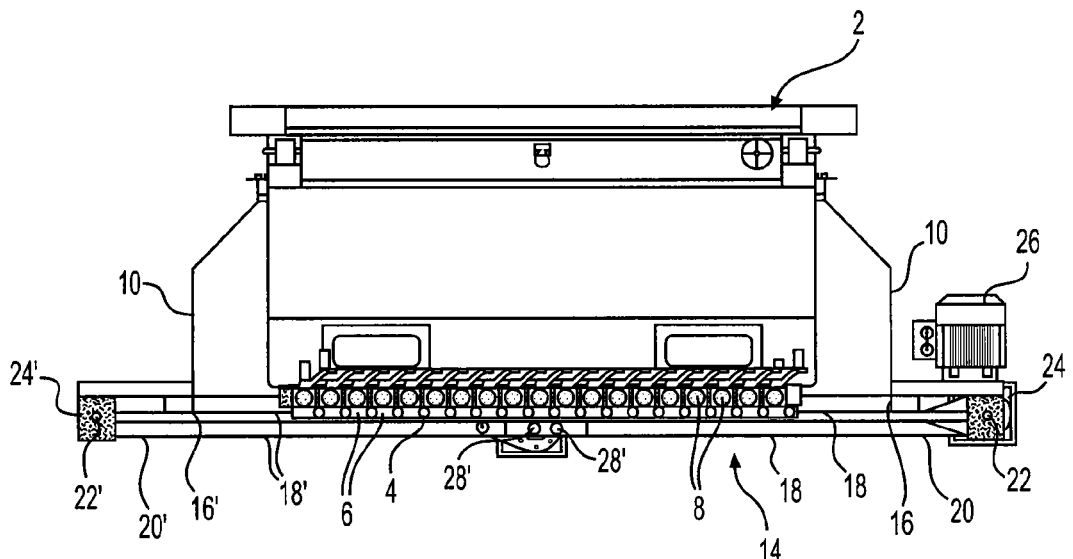
FIG. 4 shows a view, partly in section, of a preferred embodiment of a lift head for an apparatus according to the invention, as seen from the side and shown with an embodiment for a curtain which is inserted under the suction face of the lift head.
Figure 5:
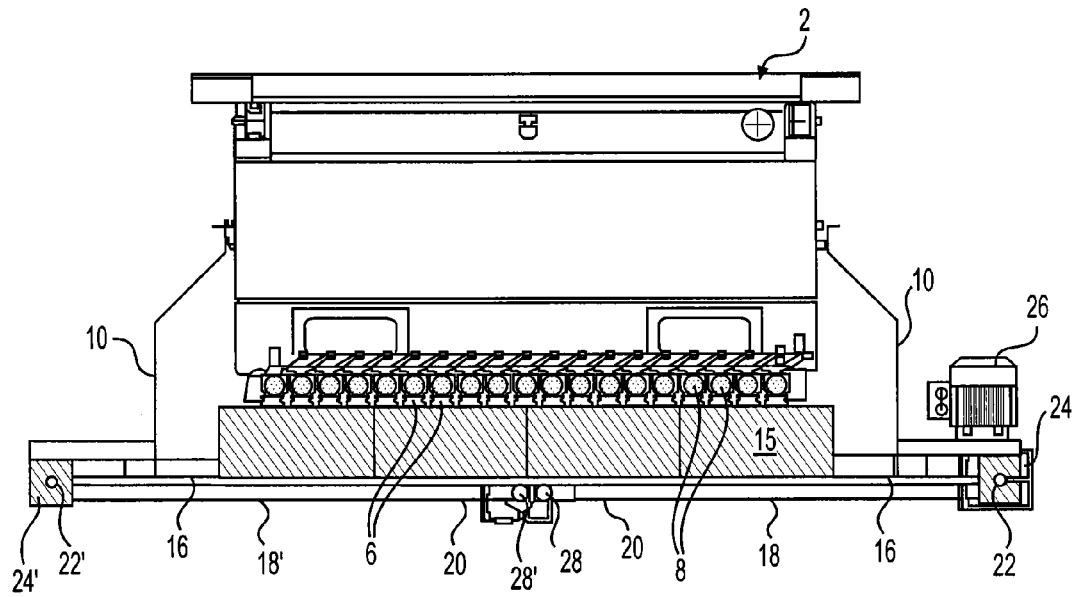
FIG. 5 shows a view, partly in section, from the side of the lift head shown in FIG. 4, where a pallet layer of box-shaped goods are carried by the suction face, and where the curtain is inserted under the pallet layer.

In a preferred embodiment, the apparatus according to the invention includes a lift head 2 adapted for destacking by layers of articles from a filled pallet that by way of example is taken from a rollerway.

The lift head 2, which is suspended from a common industrial robot 3, interacts with an vacuum source, which, by way of example is a powerful external centrifugal blower or a centrifugal blower 6' which is incorporated in the lift head 2, which via an air distribution chamber and individual ball valves 8 communicates with a large number of downwardly open suction chambers 6 that together constitute a common rectangular suction face 4, which is adapted in size for a standard pallet, which by way of example may be an EU pallet or a UK pallet.

Figure 6:
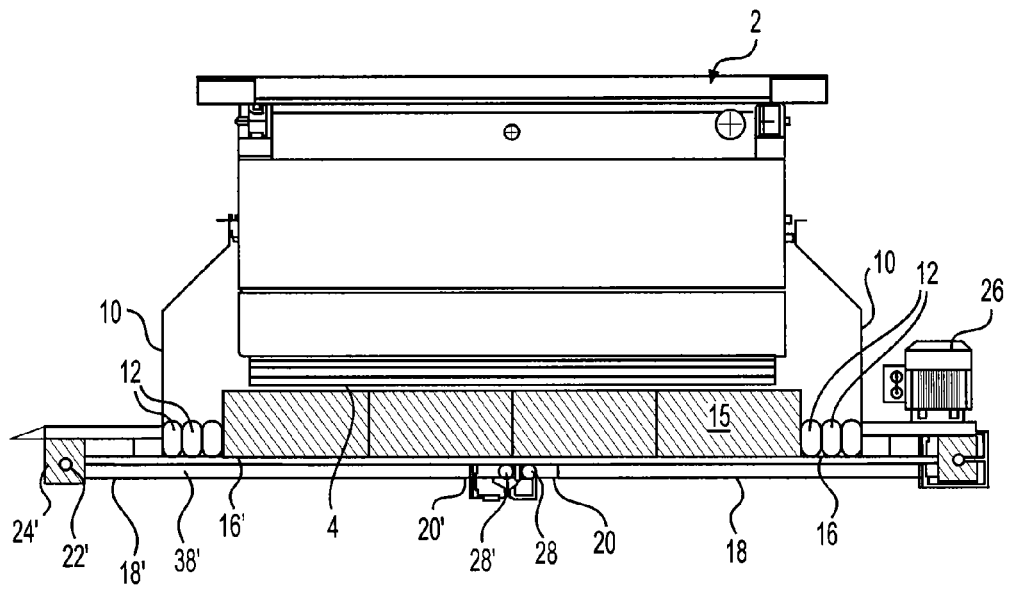
FIG. 6 shows a view, partly in section, from the side of the matter shown in FIG. 4, where it is further shown that the pallet layer is clamped and partially supported by a surrounding skirt with internal inflatable squeezing pads.
Figure 7:
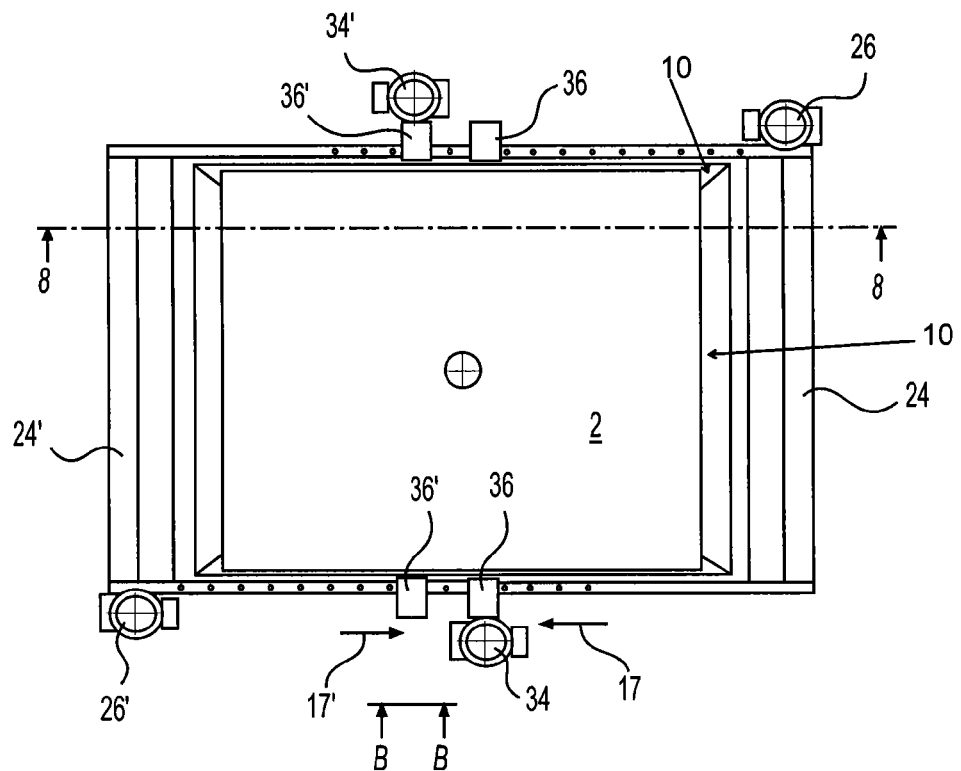
FIG. 7 shows a plan view corresponding to FIG. 3, as seen from above, where curtain parts are inserted under the pallet layer.
Figure 8:
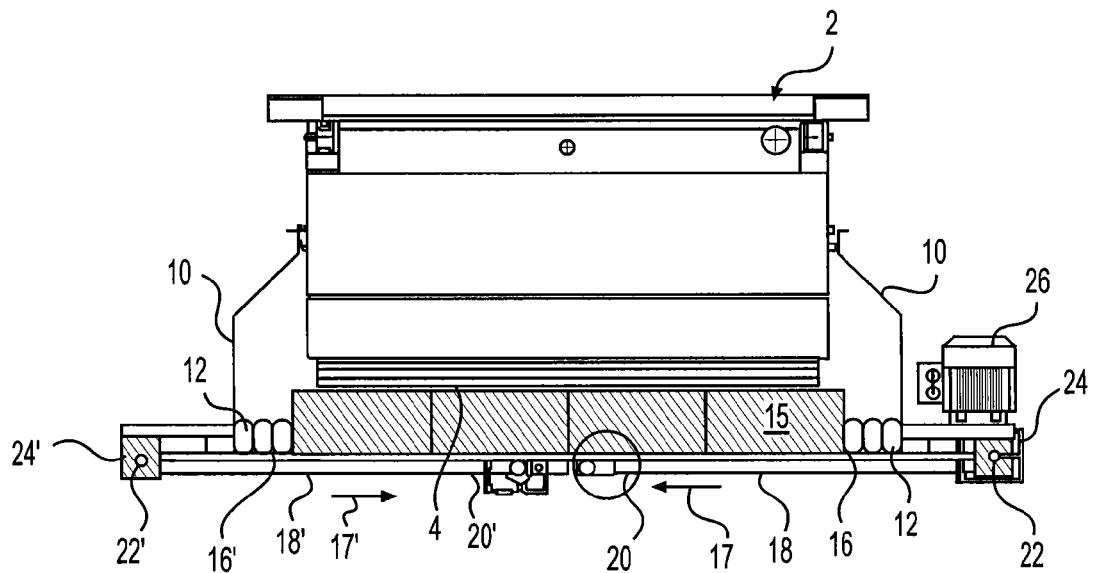
FIG. 8 shows a partly sectional view, as seen from the side, where curtain parts are inserted under the pallet layer.
Figure 9:
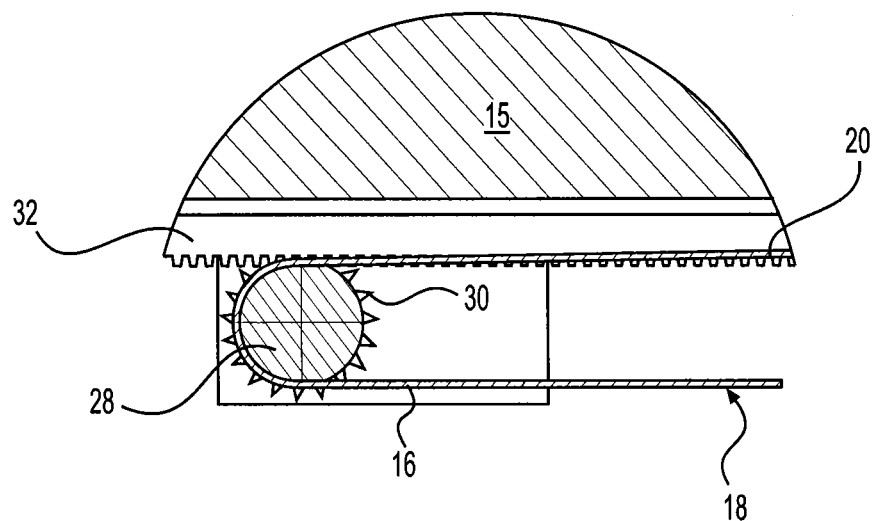
FIG. 9 shows a detail view, showing a front end of the curtain during insertion under the pallet layer.
Figure 10:
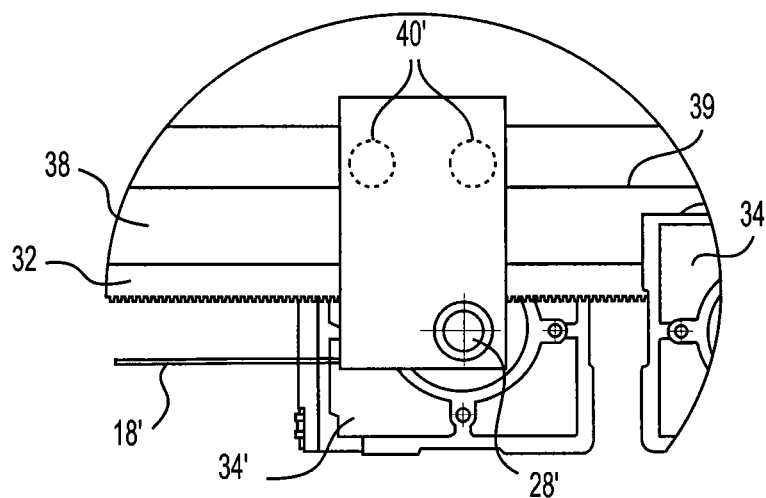
FIG. 10 shows a detail, showing an embodiment of an insertion mechanism for the curtain for an apparatus according to the invention.

The lift head 2 includes, as disclosed by WO 2000/64790 A1 and WO 2008/019691 A1 mentioned above, a special vertically adjustable, outer squeezing arrangement located on the outer sides of the suction face. The squeezing arrangement comprises inflatable squeezing pads 12 mounted on an inner side of skirt 10 on each side of the four sides of the pallet. The squeezing pads 12 project and expand inwardly from the inner surface of the skirt. The inward projection of the squeezing pads 12 is illustrated on only a single side in FIGS. 6 and 8. However, the squeezing pads 12 project inwardly from the four sides of the skirt and are identical in construction. The squeezing pads 12 are operated by a high pressure blower, which by way of example, may be a side duct blower.

The lift head 2 is mounted in a common industrial robot 3, meaning that the movement pattern of the lift head 2 is considerably extended compared with the normal movement pattern where the lift head 2 is suspended from either a stationary or a movable lift hanger. As a novelty, the industrial robot 3 provides relatively rapid swinging movements, meaning that pallet layers suspended under the suction face 4 of the lift head 2 may also be subjected to centrifugal forces, which is a new occurrence.

In order to ensure optimal suction by the suction face 4 and also during swinging movements to avoid throwing in an uncontrolled way goods from a pallet layer suspended under the suction face 4, the suction head 2 on the apparatus according to the invention includes a lower curtain 14 which, in accordance with the preferred embodiment shown in the drawing, has two curtain parts 18, 18' that may be moved, inwardly from each side of the suction face 4 in the way described below along the underside of the suction face 4 or preferably along the underside of a pallet layer 15, to a position at the middle under respectively the suction face 4 and the pallet layer 15.

The curtain 14 and the curtain parts 18 and 18' are a thin, flexible curtain of wear-resistant airtight material which for example may be a thin canvas-covered rubber curtain. A synthetic neoprene-rubber curtain is preferably used which by way of example may respectively have an anti-friction coating on the side in contact with the underside of the pallet layer 15 and the suction face 14, respectively.

In other words, the curtain parts 18 and 18' have a double function for ensuring optimal suction when operating with pallet layers 15 with goods having a relatively open structure (by way of example film-covered bottle groups) to counteract dropping of heavy articles which by way of example may occur during relatively rapid swinging movements of the suction head.

In connection with FIGS. 7-10 it is explained in more detail how the two-part curtain having the curtain parts 18 and 18' in practice are moved inwardly from both sides of the suction face 4 along the underside of a pallet layer 15 to a position under the middle of the pallet layer 15. Arrows 17 and 17' indicate in FIGS. 7-10 a situation where respective curtain parts 18 and 18' are on their way inwardly towards the end position at the middle under the pallet layer 15, at which point there will be a narrow transverse open slot of about 20 mm which will not be covered by the curtain parts 18 and 18'.

When the suction face 4 of the suction head 2 is moved downwardly for abutting upon a pallet layer 15 (by way of example box-shaped articles as shown), the curtain parts 18 and 18' will be moved right up to respective sides of the suction face 4 and will be entirely rolled onto their associated transverse shaft 22 and 22' respectively in their magazines 24 and 24' by the servomotors 26 and 26'.

Subsequently, the curtain parts 18 and 18' are moved by activating the servomotors 34 and 34' for rotating movable transverse shafts 28 and 28' which at opposing ends are designed or provided with toothed rims 30 and 30' engaging stationary toothed racks 32 and 32'. The foremost double ends 20 and 20' of the curtain parts 18 and 18' running around the transverse shafts 28 and 28' are hereby moved inwards along the underside of the pallet layer 15 until they reach the previously mentioned position at the middle under the pallet layer 15.

Prior to releasing the pallet layer 15 from the suction face 4 at the desired position, the curtain parts 18 and 18' are again to be moved outwards in order to release the pallet layer 15. This is accomplished by the servomotors 26 and 26' which draw the curtain parts 18 and 18' outwardly to both sides until the curtain parts 18 and 18' are again disposed at their initial positions rolled up on transverse shafts 22 and 22' of the magazines 24 and 24'.

It is to be noted that the application of the curtain 14 is not always required or necessary, even though the suction head 2 is handled by and industrial robot 3, as for example when handling very light or semi-heavy pallet layers 15, and where the case is pallet layers 15 with relatively light, closed box packings with a sealed surface.

Moving the curtain parts 18 and 18' in and out along each of their part of the underside of the pallet layer 15 or the suction face 4 occurs very fast (by way of example in the course of about 1-2 seconds).

Finally, it is to be noted that an alternative method of rapid moving in and out of the curtain parts 18 and 18' under the pallet layer 15 will be to use common servomotors 26 and 26' for the magazines 24 and 24 and the transverse shafts 28 and 28', as the latter by way of example could be connected to the servomotors 26 and 26' by an endless toothed belt running between toothed rims 30 and 30' at opposite ends of the shafts 28 and 28' and the servomotors 26 and 26' and over vertically adjustable tensioning gear wheels at each side of the suction head 2. Another alternative would be to use flexible drive shafts between common servomotors for the magazines 24 and 24' and the transverse shafts 28 and 28'.

REFERENCE NUMBERS OF THE DRAWING

- 2 lift head
- 3 industrial robot
- 4 suction face
- 6 suction chamber
- 8 valve
- 10 skirt
- 12 squeezing pads
- 14 curtain
- 15 pallet layer
- 16 and 16' transverse ends of curtain parts (at skirt)
- 18 and 18' curtain parts
- 20 and 20' opposite ends of curtain parts (at the middle under suction face)
- 22 and 22' shafts, stationary (magazines)
- 24 and 24' magazine
- 26 and 26' electric drive motor (servomotor)
- 28 and 28' transverse movable shafts
- 30 and 30' toothed rim at opposite ends of movable shafts
- 32 and 32' toothed rack, stationary
- 34 and 34' electric drive motor (servomotor)
- 36 and 36' support holder
- 38 and 38' support frame with
- 39 and 39' support profile
- 40 and 40' support rollers

The invention claimed is:

1. An apparatus for handling layers of palletized goods comprising:
   a lift head including a suction face sized for a pallet, downwardly open suction chambers, and being movable against a top side of an upper layer of goods on the pallet and the downwardly open suction chambers being connected via individual valves to a vacuum source and the suction face being movable against a top side of an upper layer of goods on the pallet; and wherein
   the valves are closed when an associated suction chamber is contacting a top side of the goods on an uppermost pallet layer, a vertically adjustable skirt having four inner sides disposed along all outer sides of the suction face, the vertically adjustable skirt including inflatable squeezing pads located respectively on different inner sides which exert an inwardly directed pressure on sides of at least the upper layer of goods on the pallet, the flexible curtain including curtain parts comprising means for enhancing suction by the suction face and being disposed at opposed ends of the suction face, the curtain parts being connected with the vertically adjustable skirt and being movable inwardly along an underside of a pallet layer which has been lifted to a position under a part of the suction face and the flexible curtain is disposed at the underside of the pallet layer which has been lifted and providing support for the pallet layer.

2. An apparatus according to claim 1, wherein:
   each curtain part comprises an end connected with the vertically adjustable skirt and being respectively connected to different shafts which are connected to an associated drive motor to respectively drive one of the curtain parts into a magazine, the curtain parts are movable inwardly along an underside of a pallet layer which is lifted and the shafts each have an end at which a toothed rim is located for driving a stationary toothed rack running along opposite sides of the suction face perpendicular to shafts and the shafts are driven by the associated drive motor.

3. An apparatus according to claim 1, comprising support rollers supported by a support frame.

4. An apparatus according to claim 2, comprising support rollers supported by a support frame.

5. An apparatus according to claim 2, wherein the associated drive motors comprise reversible servomotors.

6. An apparatus according to claim 4, wherein the associated drive motors comprise reversible servomotors.

7. An apparatus in accordance with claim 1 the squeezing pads are inflatable.

8. An apparatus in accordance with claim 2 the squeezing pads are inflatable.

9. An apparatus in accordance with claim 1, wherein the means for enhancing comprises a flexible material.

10. An apparatus in accordance with claim 9, wherein the flexible material is wear-resistant and airtight.

11. An apparatus in accordance with claim 2, wherein the means for enhancing comprises a flexible material.

12. An apparatus in accordance with claim 11, wherein the flexible material is wear-resistant and airtight.

* * * * *